United States Patent [19]

Gregory et al.

[11] Patent Number: 5,370,730
[45] Date of Patent: Dec. 6, 1994

[54] DYE COMPOSITION AND AQUEOUS INK DERIVED THEREFROM

[75] Inventors: Peter Gregory, Bolton; Ronald W. Kenyon, Failsworth; John E. Presgrave, Todmorden, all of England

[73] Assignee: Zeneca Limited, London, England

[21] Appl. No.: 45,303

[22] Filed: Apr. 12, 1993

[30] Foreign Application Priority Data

Apr. 10, 1992 [GB] United Kingdom ............. 9207963.1
Oct. 9, 1992 [GB] United Kingdom ............. 9221223.2

[51] Int. Cl.$^5$ .......................................... C09D 11/02
[52] U.S. Cl. ............................ 106/22 K; 534/815; 534/824
[58] Field of Search .............. 106/22 K; 8/639, 641; 534/680, 815, 824, 836, 837

[56] References Cited

U.S. PATENT DOCUMENTS

| | | | |
|---|---|---|---|
| 4,443,371 | 4/1984 | Brulard et al. | 8/641 |
| 4,767,459 | 8/1988 | Greenwood et al. | 106/22 K |
| 4,804,387 | 2/1989 | Degen et al. | 8/641 |
| 4,963,189 | 10/1990 | Hindagolla | 106/22 K |
| 5,053,495 | 10/1991 | Greenwood et al. | 534/829 |
| 5,062,893 | 11/1991 | Adamic et al. | 106/22 K |
| 5,110,917 | 5/1992 | Bauer et al. | 534/815 |
| 5,171,848 | 12/1992 | Greenwood et al. | 8/639 |
| 5,203,912 | 4/1993 | Greenwood et al. | 106/22 K |

FOREIGN PATENT DOCUMENTS

| | | | |
|---|---|---|---|
| 0212345 | 3/1987 | European Pat. Off. | C09B 67/26 |
| 0441987 | 8/1991 | European Pat. Off. | |
| 0494522 | 7/1992 | European Pat. Off. | |

*Primary Examiner*—Helene Klemanski
*Attorney, Agent, or Firm*—Cushman, Darby & Cushman

[57] ABSTRACT

Dye compositions and aqueous inks derived therefrom, especially suitable for use in ink jet printing in which the dye composition contains (a) one or more dyes which, in the free acid form, are of Formula (1):

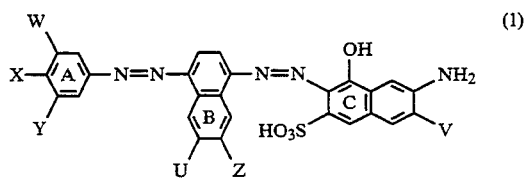

(1)

wherein
W is H or COOH;
X is H or COOH;
Y is H or COOH;
U & Z are each independently H, COOH or SO$_3$H; and
V is H or SO$_3$H;

and (b) one or both dyes which in the free acid form is of Formula (2):

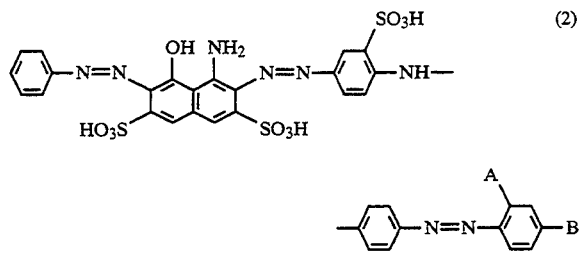

(2)

wherein
A is NH$_2$ and B is OH; or
A is OH and B is NH$_2$.

8 Claims, No Drawings

DYE COMPOSITION AND AQUEOUS INK DERIVED THEREFROM

This specification describes an invention relating to composition of anionic dyes and particularly a composition of black anionic dyes which is especially suitable for use in ink jet printing.

According to the present invention there is provided a composition comprising as first component (a) one or more dyes which, in the free acid form, are of Formula (1):

$$\text{(1)}$$

(structure: W, X-A-N=N-...-N=N-C(OH)(NH$_2$)-..., with B ring bearing HO$_3$S, U, Z; V substituent)

wherein
W is H or COOH;
X is H or COOH;
Y is H or COOH;
U & Z are each independently H, COOH or SO$_3$H; and
V is H or SO$_3$H;
provided the dye contains at least two COOH groups and that the number of COOH groups is equal to or greater than the number of SO$_3$H groups; and as second component (b) either one of, or both, dyes which, in the free acid form, are of the Formula (2):

$$\text{(2)}$$

(structure with OH, NH$_2$, HO$_3$S, SO$_3$H, SO$_3$H, NH— linkage to A-N=N-B phenyl groups)

wherein
A is NH$_2$ and B is OH; or
A is OH and B is NH$_2$.

The dye or dyes of Formula (1) preferably contains two COOH groups. The dye of Formula (1) preferably contains one or two SO$_3$H groups, i.e. only one of V and Z, preferably Z, is SO$_3$H. More preferably the dye of Formula (1) contains only one SO$_3$H group, i.e. neither V nor Z is SO$_3$H.

In the dye of Formula (1), it is preferred that there are two COOH groups present on Ring A and more especially that these are in the 3 and 5 positions, i.e. that X is H and W and Y are both COOH. In a less preferred dye W is COOH and X and Y are both H, or X is COOH and W and Y are both H, or W and X are both COOH and Y is H.

In the dye of Formula (1) it is preferred that U is H and that Z is H or SO$_3$H and more especially H. It is also preferred that V is H.

Preferred diazo components from which Ring A in the dye of Formula (1) may be derived are 3-aminobenzoic acid, 4-aminobenzoic acid, 4-aminophthalic acid, 2-aminoterephthalic acid and especially 5-aminoisophthalic acid Preferred coupling components from which the central group B in the dye of Formula (1) may be derived are 1,6-Cleves acid, 1,7-Cleves acid, mixed Cleves acids, 8-amino-2-naphthoic acid, mixtures of 5-amino- and 8-amino-2-naphthoic acids and especially 1-naphthylamine.

If component (a) comprises a dye of Formula 1 in which Z or U is COOH or SO$_3$H, this dye conveniently comprises a mixture of a dye in which Z is COOH or SO$_3$H and U is H with an analogous dye in which Z is H and U is COOH or SO$_3$H group respectively. Such a mixture of dyes can be made directly from the mixed isomers of 5-amino-2-naphthoic acid and 8-amino-2-napthoic acid or the mixed isomers of 1,6-Cleves acid and 1,7-Cleves acid respectively without the need to separate the desired isomer from the mixed isomers.

Preferred coupling components from which the third group C in the dye of Formula (1) may be derived are 2R acid and especially Gamma acid.

Examples of preferred dyes of Formula (1) in which V is H are shown in Table A:

TABLE A

| Dye | W | X | Y | Z | U |
|-----|------|------|------|------|------|
| 1 | COOH | H | COOH | H | H |
| 2 | COOH | COOH | H | H | H |
| 3 | COOH | H | H | H | H |
| 4 | H | COOH | H | H | H |
| 5 | COOH | H | COOH | SO$_3$H | H |
| 6 | COOH | H | COOH | COOH | H |
| 7 | COOH | H | COOH | H | SO$_3$H |

The composition according to the invention may comprise one or more dyes of Formula (1) and one or two dyes of Formula (2). Where the composition contains more than one dye of Formula (1) it is preferred that at least one of the dyes is Dye 1 (see Table A above) and this preferably comprises at least 50% and more preferably at least 75% of the dyes of Formula (1) in the composition. It is, however, preferred that the composition contains only one dye of Formula (1) and that this is Dye 1 or Dye 5. The composition preferably contains two dyes of Formula (2) and the relative proportions of these are preferably from 60:40 to 40:60, more preferably from 55:45 to 45:55 and especially from 52:48 to 48:52 by weight.

An especially preferred embodiment of the second component (b) is an approximately 1:1 mixture of the two dyes of Formula (2). Such a mixture is commercially available, in the form of a purified aqueous solution of the sodium salts, as PROJET Black 1.

The relative proportions of the dye or total dyes of Formula (1) to the dye or total dyes of Formula (2) is preferably from 99:1 to 40:60 and more preferably from 95:5 to 75:25 by weight and especially from 95:5 to 85:15.

The composition preferably comprises a mixture of a dye of Formula (1), especially Dye 1, and two dyes of Formula (2), in which the two dyes of Formula (2) are present in approximately equal amounts.

The dyes of Formula (1) are known and can be made by processes which are described in EP 356080. The dyes of Formula (2) are also known and can be made by processes which are described in U.S. Pat. No. 4,479,906.

The dyes of Formulae (1) and (2) are preferably in the form of a salt with an alkali metal cation or optionally substituted ammonium cation or a mixture of such cations.

The substituted ammonium cation may be a quaternary ammonium cation of the formula $^+NQ_4$ in which each Q independently is an organic radical, or two or three Qs together with the nitrogen atom to which they are attached form a heterocyclic ring and all remaining Qs are selected from $C_{1-4}$-alkyl. Preferred organic radicals represented by Q are $C_{1-4}$-alkyl radicals, especially methyl radicals. Preferred heterocyclic rings formed by $NQ_4$ are 5 or 6 membered heterocyclic rings.

As examples of quaternary ammonium groups of formula $^+NQ_4$ there may be mentioned $N^{+(CH_3)_4}$, $N^+(CH_2CH_3)_4$, N-methyl pyridinium, N,N-dimethyl piperidinium and N,N-dimethyl morpholinium.

Alternatively the substituted ammonium cation may be of the formula $^+NHT_3$ wherein each T independently is H, $C_{1-4}$-alkyl or hydroxy-$C_{1-4}$-alkyl provided at least one T is $C_{1-4}$-alkyl, or two or three groups represented by T together with the nitrogen atom to which they are attached form a 5 or 6 membered ring, especially a pyridine, piperidine or morpholine ring. It is preferred that the substituted ammonium cation is derived from an amine which is volatile under ambient conditions, i.e. at 20° C. and atmospheric pressure.

As examples of groups of formula $^+NHT_3$ there may be mentioned $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $(CH_3)_2CHN^+H_3$, pyridinium, piperidinium and morpholinium.

It is especially preferred that the dye or dyes of Formula (1) are present as the ammonium or salt as the mono- or di-methylammonium salts. It is also preferred that the dye or dyes of Formula (2) are present as the sodium, potassium, or lithium or as the ammonium or as the mono- or di-methylammonium salts.

The dyes can be converted into their ammonium salt form by dissolving them in the form of a salt with an alkali metal, acidifying with a mineral acid, adjusting the solution to pH 9–9.5 with ammonia or the appropriate amine and removing alkali metal salt by dialysis.

The composition of the present invention is notable for its strong neutral black shade, fastness to water and light, good solubility in water and mixtures thereof with water-miscible organic solvents and low tendency to bronze when printed on paper.

The compositions of the invention are especially useful for the preparation of inks, especially aqueous inks, used in ink jet printing and particularly thermal ink jet printing.

The water-fastness of the composition on paper is generally increased if they are printed from an aqueous medium in the form of an ammonium or substituted ammonium salt.

According to a further feature of the present invention there is provided an ink comprising a composition of dyes of Formula 1 and Formula 2 in a liquid medium.

A preferred ink comprises a composition according to the present invention and an aqueous medium. It is preferred that the composition is completely dissolved in the liquid medium to form a solution.

The ink preferably contains from 0.5% to 20%, more preferably from 0.5% to 15%, and especially from 1% to 5%, by weight of the composition, based on the total weight of the ink.

The liquid medium is preferably water or a mixture comprising water and one or more water-soluble organic liquid, the water and organic liquid(s) preferably being in a weight ratio from 99:1 to 50:50 and more preferably 95:5 to 60:40 and especially 95:5 to 80:20.

The water-soluble organic liquid is preferably a $C_{1-4}$-alkanol such as methanol, ethanol, n-propanol, isopropanol, n-butanol, sec-butanol, tert-butanol or isobutanol; an amide such as dimethylformamide or dimethylacetamide; a ketone or ketone alcohol such as acetone or diacetone alcohol; an ether such as tetrahydrofuran or dioxane; an oligo or polyalkylene glycol such as diethylene glycol, triethylene glycol, polyethylene glycol or polypropylene glycol; an alkylene glycol or thioglycol containing a $C_{2-6}$-alkylene group such as ethylene glycol, propylene glycol, butylene glycol, 1,4-pentylenediol or hexylene glycol; a thiodiglycol; a polyol such as glycerol or 1,2,6-hexanetriol; a lower alkyl ether of an alkylene glycol or an oligo alkylene glycol such as 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol or 2-[2-butoxy-ethoxy]ethanol; a heterocyclic ketone or sulphone, such as 2-pyrrolidone, N-methyl-2-pyrrolidone or sulpholane; or a mixture containing two or more of the aforementioned water-soluble organic solvents.

Preferred water-soluble organic solvents are selected from 2-pyrrolidone, N-methylpyrrolidone, sulpholane, an alkylene glycol or a lower alkyl ether of a polyhydric alcohol, such as ethylene glycol, diethylene glycol, triethylene glycol or 2-methoxy-2-ethoxy-2-ethoxyethanol; and a polyethylene glycol with a molecular weight of up to 500. A preferred specific solvent mixture is a binary or tertiary mixture of water and diethylene glycol; water and 2-pyrrolidone; water, ethylene glycol and 2-pyrrolidone; or water, ethylene glycol and N-methylpyrrolidone in weight ratio as herein described.

The water soluble organic solvent generally promotes the solubility of the dye in the liquid medium and also the penetration of the dye into the substrate during printing.

Examples of other suitable ink media are given in U.S. Pat. Nos. 4,963,189, 4,703,113, 4,626,284 and EP 4,251,50A.

It is preferred that the inks of the present invention comprise one or more of a penetrant, such as the water-soluble organic solvents hereinbefore described, to assist permeation of the dye into a paper substrate, a kogation-reducing agent to prevent or reduce the build-up of residue (koga) on the resistor surface in thermal ink jet printers and a buffer such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation.

As examples of phosphate salts there may be mentioned dibasic phosphate ($HPO_4^{2-}$) monobasic phosphates ($H_2PO_4^-$) and polyphosphates ($P_2O_7^{4-}$). The selection of counter ion is not believed to be critical and examples include alkali metals, ammonium and alkylammonium cations.

The kogation-reducing agent is preferably present in the ink at a concentration from 0.001% to 15%, based on oxo-anion, and more preferably from 0.01% to 1% (by weight).

A further aspect of the present invention provides a process for printing a substrate with an ink using an ink jet printer, characterised in that the ink contains a composition according to the first aspect of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

A preferred substrate is an overhead projector slide or a cellulosic substrate, especially plain paper, which may have an acid, alkaline or neutral character.

The preferred ink used in the process is as hereinbefore described.

According to a still further aspect of the present invention there is provided a paper or an overhead projector slide printed with a composition according to the invention.

It has been found that further useful effects can be obtained if the composition or inks derived therefrom, as hereinbefore described, also contain a further dye or dyes of the type disclosed for ink jet printing in EP 468647; EP 468648; EP 468649 and EP 933000143. These dyes and especially the yellow dyes of EP 468647 and the cyan dyes of EP 93300014.3 assist further in the suppression of bronzing and can be used either alone or in combination. The present composition preferably comprises up to about 20% by weight of such dyes but more preferably from 2% to 10%.

The invention is further illustrated by the following Examples in which all parts and percentages are by weight unless otherwise indicated.

EXAMPLE 1

An ink was prepared comprising a solution of the NH$_4^+$ salt of Dye 1 (1.25% by weight) and the NH$_4^+$ salt of an approximately 1:1 mixture of the two dyes of Formula 2 (1.25% by weight) in 90:10 water: ethylene glycol. The dyes had been purified by dialysis of aqueous solutions to remove inorganic salts and other water-soluble impurities. The ink was screened to remove water-insoluble impurities and placed in the cartridge of a commercially available thermal ink jet printer. A square pattern was printed on two grades of office paper one an acidic paper and the other an alkaline paper and the absorption peak of each print was determined with a densitometer. Each printed square was then immersed in a bath of stirred water for 5 minutes, after which it was removed, dried and the absorption peak was determined again. The area under the absorption peak for each print was determined (hereinafter A1 and A2 respectively). The water fastness (WF) of the printed pattern is given, as a percentage, by the following expression:

$$WF = \frac{A2}{A1} \times 100$$

The ink was examined visually by an experienced colorist and reported to have a neutral black shade similar to that of a standard IJP dye (C.I. Food Black 2). Examples 2 to 5

The procedure of Example 1 was repeated except that the dyes and amounts thereof were as shown in the following table which also gives the results of the fastness and density measurements for the ink of Example 1.

| Example | Dye 1 Salt | Dye 1 Weight | Dye 2 Salt | Dye 2 Weight | Print Density (A1) Acid | Print Density (A1) Alkaline | Water Fastness (WF) Acid | Water Fastness (WF) Alkaline |
| --- | --- | --- | --- | --- | --- | --- | --- | --- |
| 1 | NH$_4^+$ | 1.25 | NH$_4^+$ | 1.25 | 24.2 | 29.1 | 92 | 85 |
| 2 | NH$_4^+$ | 1.25 | Na$^+$ | 1.25 | 25.8 | 28.2 | 89 | 82 |
| 3 | NH$_4^+$ | 2.00 | NH$_4^+$ | 0.50 | 20.2 | 23.4 | 96 | 85 |
| 4 | NH$_4^+$ | 2.25 | NH$_4^+$ | 0.25 | 18.3 | 24.1 | 98 | 88 |
| 5 | NH$_4^+$ | 2.25 | Na$^+$ | 0.25 | 19.0 | 26.0 | 98 | 90 |

Examples of other specific liquid media which can be used to prepare inks containing the composition of dyes disclosed in Examples 1 to 5 and other compositions of dyes within the scope of the present invention are:

Water (60); Ethylene glycol (40)
Water (85); Diethylene glycol (15)
Water (90); Diethylene glycol (10)
Water (65); Glycerol (25); Triethanolamine (10)
Water (80); Ethylene glycol (15); Polyethylene glycol, MW 200 (5)
Water (80); Ethylene glycol (15); N-Methylpyrrolidone (5)
Water (80); Ethylene glycol (15); 2-Pyrrolidone (5)
Water (90); 2-Pyrrolidone (10)

We claim:
1. A composition comprising as a first component
(a) one or more dyes which, in the free acid form, are of Formula (1):

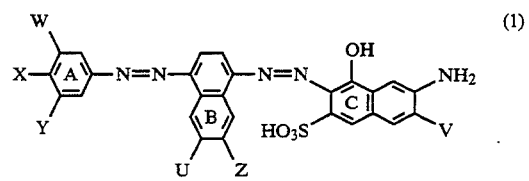

wherein
W is H or COOH;
X is H or COOH;
Y is H or COOH;
U & Z are each independently H, COOH or SO$_3$H; and
V is H or SO$_3$H;
provided the dye contains at least two COOH groups and that the number of COOH groups is equal to or greater than the number of SO$_3$H groups; and as second component (b) an approximately 1:1 mixture of the two dyes which, in the free acid form, are of the Formula (2):

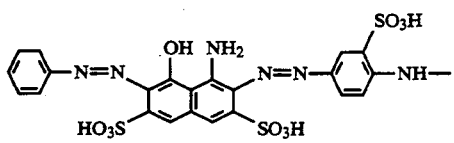

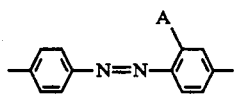

wherein

A is $NH_2$ and B is OH; and

A is OH and B is $NH_2$.

2. A composition according to claim 1 wherein the first component (a) is the dye of Formula (1) in which W and Y are both COOH. X, U and V are all H and Z is H or $SO_3H$.

3. A composition according to claim 1 wherein both components are in the form of salts with an optionally substituted ammonium cation.

4. A composition according to claim 1 containing from 95% to 85% of the first component (a) and from 5% to 15% of the second component (b).

5. An ink comprising a solution of a composition according to claim 1 in a liquid medium comprising water or a mixture of water and a water-soluble organic liquid.

6. An ink according to claim 5 wherein the organic liquid is selected from 2-pyrrolidone, sulpholane, N-methyl-2-pyrrolidone. 1,4-pentylenediol and 2-(2-butyoxyethoxy)ethanol.

7. An ink according to claim 5 wherein the weight ratio of water to organic liquid in the liquid medium is from 95:5 to 80:20.

8. An ink according to claim 5 wherein the amount of the composition is from 1% to 5% by weight based on the total weight of the ink.

* * * * *